(12) United States Patent
Gerello

(10) Patent No.: US 7,482,064 B2
(45) Date of Patent: Jan. 27, 2009

(54) WOOD PANEL

(75) Inventor: Brian Christopher Gerello, Statham, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 519 days.

(21) Appl. No.: 11/199,323

(22) Filed: Aug. 8, 2005

(65) Prior Publication Data

US 2007/0029041 A1   Feb. 8, 2007

(51) Int. Cl.
*B32B 23/04*   (2006.01)
(52) U.S. Cl. .................. 428/532; 428/533; 428/534; 428/535; 428/536; 428/537.1; 156/325; 156/330; 156/330.9; 156/331.1; 156/335

(58) Field of Classification Search .................. 428/532, 428/533, 534, 535, 536, 537.1; 156/325, 156/330, 330.9, 331.1, 335
See application file for complete search history.

(56) References Cited

U.S. PATENT DOCUMENTS 4,961,795 A * 10/1990 Detlefsen et al. ........... 156/62.2
6,461,743 B1 * 10/2002 Tanzer et al. ................ 428/535

* cited by examiner

*Primary Examiner*—Leszek Kiliman
(74) *Attorney, Agent, or Firm*—J.M. Huber Corp; David M. Goodrich; Patricia L. Ades

(57) ABSTRACT

Disclosed is a composite wood component having upper and lower surface layers and a core layer; a first glueline layer; a second glueline layer; and an overlay layer.

13 Claims, No Drawings

WOOD PANEL

BACKGROUND OF THE INVENTION

Wood can be used to construct almost any part of a home from the roofing and exterior walls to the floor and interior architectural elements as well as basic domestic items like furniture and cabinets. However, in recent years the cost of solid timber wood has increased dramatically as its supply shrinks due to the gradual depletion of old-growth and virgin forests. Indeed, it is particularly expensive to manufacture solid hardwood furniture and architectural features from such material because typically less than half of harvested timber wood is converted to natural solid wood lumber, the remainder being discarded as scrap.

Accordingly, because of both the cost of high-grade timber wood as well as a heightened emphasis on conserving natural resources, wood-based alternatives to natural solid wood lumber have been developed that make more efficient use of harvested wood and reduce the amount of wood discarded as scrap. Plywood, particle board and oriented strand board ("OSB") are examples of wood-based composite alternatives to natural solid wood lumber that have replaced natural solid wood lumber in many structural applications in the last seventy-five years. These wood-based composites not only use the available supply of timber wood more efficiently, but they can also be formed from lower-grade wood species, and even from wood wastes.

These wood-based composite materials do offer a highly efficient way to use available wood material, however, because they typically consist of small particles (particle board), wood strands (OSB), flat pieces of low-grade wood species or some similar such material, products made from them do not have an attractive, grained appearance, but rather tend to have unsatisfactory aesthetic finishes. This may make them unsuitable for use in interior furnishings and for articles of furniture and cabinetry. Additionally wood-based composites can suffer when individual strands "pop up." This makes the installation of surface covering materials, such as vinyl, hardwood flooring and ceramic tiles more difficult, and thus makes the use of wood-based of wood-based composite them unsuitable for use as floor materials.

Beyond the surface defects described above, there are still other difficulties presented by the surfaces of the wood-based composites. In particular, the wood-based composites tend to excrete wood extractives, which are found in the cambium or outer part of a tree that is adjacent to its bark. These extractives themselves tend to migrate from the wood-based composite into the floor or wall covering placed on top of the wood composite, causing staining in the covering. This problem with extractives especially problematic in the case of wood-based composites, because aspen and Southern yellow pine, two of the types of wood commonly used in wood-based composites, have particularly substantial amounts of extractives capable of migrating, and thereby staining floor covering materials.

One approach to addressing the aforementioned aesthetic problems is to prepare a special wood composite material by placing veneer layers upon the top and bottom surfaces of an internal, or "core" composite wood material. These veneer sheets are very thin, having a thickness of no greater than ⅛ inch, and are typically made from a decorative wood material, such as oak, birch, cherry and mahogany.

However, while these veneer-covered wood composite materials do have improved aesthetic finishes, they can be somewhat difficult to prepare and manufacture. In particular is a common problem referred to as "telegraphing", where due to the thinness of the veneer layer, the texture of the underlying wood composite material presses through the veneer layer creating a non-uniform, uneven surface with numerous imperfections. Other surface defects like pitting, indentations, and voids have also been noticed as a result of applying a veneer.

Several solutions have been proposed to eliminate surface telegraphing. One technique is to use an intermediate layer between the core layer (especially an oriented strand board core layer) and the veneers such as is described in U.S. Pat. No. 5,506,026. This intermediate layer provides a smooth surface onto which the veneers may be laminated without surface telegraphing and indentations. While this technique is often effective it also creates a five-ply product that is considerably more expensive because of additional labor and material costs than a three-ply product. Other investigators, such as shown in U.S. Pat. No. 6,461,743 have considered using a combination of both an intermediate layer and additional control over the surface. But while this does adequately ameliorate surface telegraphing, it is even more time-intensive and costly than merely using an intermediate layer without further pretreatment.

Still another technique for preventing surface telegraphing is the application of a coating or putty to hide the texture or surface imperfections on the wood composite's surface, such as shown in U.S. Pat. No. 5,616,419. Unfortunately, this technique not only often fails to prevent telegraphing, it is also time consuming to distribute the glue across the surface of the wood composite material in sufficient concentration and evenness to ensure that the surface telegraphing will be absent.

Given the foregoing, there is a continuing need for an efficiently constructed wood composite material that has the excellent surface finish to be useful for applications where surface appearance is important such as interior domestic furnishings, furniture and cabinetry.

BRIEF SUMMARY OF THE INVENTION

The present invention includes a wood panel comprising a composite wood component having upper and lower surface layers and a core layer; a first glueline layer; a second glueline layer; and an overlay layer.

The present invention also includes a process for preparing a wood panel comprising the steps of: providing a composite wood component, the wood component including an upper surface layer, the upper surface layer having an exterior face; providing an overlay layer, having a thickness of about 0.028 inches to about 1.250 inches; applying a first glueline layer to the exterior face of the upper surface layer; applying a second glueline layer onto the first glueline layer; and applying the overlay layer to the second glueline layer to form a wood panel.

DETAILED DESCRIPTION OF THE INVENTION

All parts, percentages and ratios used herein are expressed by weight unless otherwise specified. All documents cited herein are incorporated by reference.

As used herein, "wood" is intended to mean a cellular structure, having cell walls composed of cellulose and hemicellulose fibers bonded together by lignin polymer.

By "laminated", it is meant material composed of layers and bonded together using resin binders.

By "wood composite material" or "wood composite component" it is meant a composite material that comprises wood and one or more other additives, such as adhesives or waxes.

Non-limiting examples of wood composite materials include oriented strand board ("OSB"), structural composite lumber ("SCL"), waferboard, particle board, chipboard, medium-density fiberboard, plywood, and boards that are a composite of strands and ply veneers. As used herein, "flakes", "strands", and "wafers" are considered equivalent to one another and are used interchangeably. A non-exclusive description of wood composite materials may be found in the Supplement Volume to the Kirk-Othmer Encyclopedia of Chemical Technology, pp 765-810, 6$^{th}$ Edition, which is hereby incorporated by reference.

The following describes preferred embodiments of the present invention, which provides a wood panel comprising a wood composite component and a dual glueline overlay layer.

In the present invention surface telegraphing, voids, and blistering have been avoided by applying this dual glueline overlay, which comprises a first glueline layer, a second glueline layer, and an overlay layer to each surface of the wood composite material. While not intended to be limited by theory, it is believed that the resins used in the first glueline layer (such as epoxy and hotmelt resins) melt first (i.e., at a lower temperature) and flow into the voids on the surface of the wood composite thus covering and/or filling the voids and imperfections and suppressing telegraphing, while the resins in the second glueline layer (such as phenolic and melamine resins) melt second (i.e., at a higher temperature) to cure the overlay layer and bond it to the underlying layers to form the wood composite panel.

Dual Glueline Overlay

The dual glueline overlay includes first and second gluelines on top of which is placed an overlay layer.

The first glueline layer is selected from either or both of epoxy or hotmelt resins. The second glueline layer is selected from either or both of melamine or phenolic resins. These gluelines are typically supplied in the form of resin sheets. The first glueline layer has a lower melting temperature than the second glueline layer. The preferred epoxy material is the EC-44074 crystalline epoxy resin sheets purchased from Valspar Corporation, Minneapolis, Minn. Preferred melamine and phenolic resin sheets are the M-53 and P-47 sheets available from Panolam Industries in Morristown, TN. Preferably, the phenolic is provided in the form of either a phenolic-impregnated kraft paper, or it is already pre-applied to the high-pressure laminate. The high pressure laminate/phenolic material is available from the Dynea Corporation. The phenolic overlay material, Ultim ReadyForm 3326 and 3328, are available from Dynea Corporation, and the high-pressure laminates available from Pionite Decorative Surfaces are G27, G48, F28 and F39.

The overlay layer is either a high-pressure laminate or kraft paper. The high-pressure laminate is either a vertical grade laminate or a horizontal grade laminate. Horizontal grade laminates have a thickness of about 0.048 inches to about 1.250 inches and are not intended to be constricted to a tight radius. Typical surfaces to be covered by horizontal laminates include countertops, vanity tops, store fixtures, windowsills, desks, tabletops, convector covers, furniture and casework. By contrast, a vertical grade laminate is a relatively thin laminate, having a thickness of about 0.028 inches to about 0.875 inches and has a lower impact resistance than a horizontal grade laminate. It is designed to be used primarily for aesthetic reasons in applications such as wall paneling and is thus capable of being fit in high radius areas, for example around moldings and surface finishing details. Vertical grade laminates are thinner, about 0.028 to about 0.8750 inches, and do not have the impact resistance of horizontal grade laminates. Vertical surfaces include wall panels, elevator cabs, toilet compartments, etc. The Ultim ReadyForm™ kraft paper provided Dynea Corporation has a basis weight in the range of 70-148 lbs (lbs per 3000 sq.ft.), comes in a variety of colors, provided at 102" wide by 7,500 linear feet, has resin content of 34-36% solids and a glueline weight of 9-11 lbs/msf The high-pressure laminates have a basis weight of 25-46 lbs, comes in a variety of colors and wood grains, provided in 4'×8' sheets or sizes thereof, and has good resistance to wear, impact, boiling water, radiant heat, high temperatures, blistering and light (UV).

Suitable horizontal grade laminates include G48 and F39 laminates available from Panolam Industries out of Morristown, Tenn. Suitable vertical grade laminates include G27 and F28 from Pionite, 7039-60, 7040A-60 and 7054-60 from Wilsonart and Grade 82, 83, 84, 85, and 86 available from Formica.

As mentioned above, the overlay layer may be Kraft paper. The Kraft paper is preferably a 132# phenolic impregnated Kraft paper supplied by the Dynea Corporation, Tacoma, Wash.

Thus, the wood panel of the present invention is constructed by forming a succession of layers: a first glueline layer adhered directly to the surface of the wood panel, a second glueline layer adhered to the first glueline, and then finally a top overlay layer being either a high-pressure laminate ("HPL") or kraft paper. Preferably, the wood panel of the present invention has this multi-layer construction on both the upper surface and lower surface of the composite wood component.

Wood Composite Component

Preferably, the wood composite component is made from OSB material. The oriented strand board is derived from a starting material that is naturally occurring hard or soft woods, singularly or mixed, whether such wood is dry (having a moisture content of between 2 wt % and 12 wt %) or green (having a moisture content of between 30 wt % and 200 wt %). Typically, the raw wood starting materials, either virgin or reclaimed, are cut into strands, wafers or flakes of desired size and shape, which are well known to one of ordinary skill in the art.

After the strands are cut they are dried in an oven and then coated with a special formulation of one or more polymeric thermosetting binder resins, waxes and other additives. The binder resin and the other various additives that are applied to the wood materials are referred to herein as a coating, even though the binder and additives may be in the form of small particles, such as atomized particles or solid particles, which do not form a continuous coating upon the wood material. Conventionally, the binder, wax and any other additives are applied to the wood materials by one or more spraying, blending or mixing techniques, a preferred technique is to spray the wax, resin and other additives upon the wood strands as the strands are tumbled in a drum blender.

After being coated and treated with the desired coating and treatment chemicals, these coated strands are used to form a multi-layered mat, preferably a three layered mat. This layering may be done in the following fashion. The coated flakes are spread on a conveyor belt to provide a first ply or layer having flakes oriented substantially in line, or parallel, to the conveyor belt, then a second ply is deposited on the first ply, with the flakes of the second ply oriented substantially perpendicular to the conveyor belt. Finally, a third ply having flakes oriented substantially in line with the conveyor belt, similar to the first ply, is deposited on the second ply such that plies built-up in this manner have flakes oriented generally perpendicular to a neighboring ply. Alternatively, but less preferably, all plies can have strands oriented in random directions. The multiple plies or layers can be deposited using generally known multi-pass techniques and strand orienter equipment. In the case of a three ply or three layered mat, the first and third plys are surface layers, while the second ply is a core layer. The surface layers each have an exterior face.

The above example may also be done in different relative directions, so that the first ply has flakes oriented substantially perpendicular to conveyor belt, then a second ply is deposited on the first ply, with the flakes of the second ply oriented substantially parallel to the conveyor belt. Finally, a third ply having flakes oriented substantially perpendicular with the conveyor belt, similar to the first ply, is deposited on the second ply.

Various polymeric resins, preferably thermosetting resins, may be employed as binders for the wood flakes or strands. Suitable polymeric binders include isocyanate resin, urea-formaldehyde, polyvinyl acetate ("PVA"), phenol formaldehyde, melamine formaldehyde, melamine urea formaldehyde ("MUF") and the co-polymers thereof. Isocyanates are the preferred binders, and preferably the isocyanates are selected from the diphenylmethane-p,p'-diisocyanate group of polymers, which have NCO-functional groups that can react with other organic groups to form polymer groups such as polyurea, —NCON—, and polyurethane, —NCOON—; a binder with about 50 wt % 4,4-diphenyl-methane diisocyanate ("MDI") or in a mixture with other isocyanate oligomers ("pMDI") is preferred. A suitable commercial pMDI product is Rubinate 1840 available from Huntsman, Salt Lake City, Utah, and Mondur 541 available from Bayer Corporation, North America, of Pittsburgh, Pa. Suitable commercial MUF binders are the LS 2358 and LS 2250 products from the Dynea corporation.

The binder concentration is preferably in the range of about 3 wt % to about 8 wt %. A wax additive is commonly employed to enhance the resistance of the OSB panels to moisture penetration. Preferred waxes are slack wax or an emulsion wax. The wax solids loading level is preferably in the range of about 0.1 wt % to about 3.0 wt % (based on the weight of the wood). A preferred, enhanced resin composition described in greater detail in U.S. Pat. No. 6,479,127.

After the multi-layered mats are formed according to the process discussed above, they are compressed under a hot press machine that fuses and binds together the wood materials, binder, and other additives to form consolidated OSB panels of various thickness and sizes. The high temperature also acts to cure the binder material. Preferably, the panels of the invention are pressed for 2-15 minutes at a temperature of about 175° C. to about 240° C. The resulting composite panels will have a density in the range of about 35 lbs/ft$^3$ to about 48 lbs/ft$^3$ (as measured by ASTM standard D1037-98). The density ranges from 40 lbs/ft$^3$ to 48 lbs/ft$^3$ for southern pine, and 35 lbs lbs/ft$^3$ to 42 lbs/ft$^3$ for Aspen. The thickness of the OSB panels will be from about 0.6 cm (about ¼") to about 5 cm (about 2"), such as about 1.25 cm to about 6 cm, such as about 2.8 cm to about 3.8 cm.

Next, the engineered wood component (e.g., the OSB panel prepared according to the aforementioned procedure) and the dual glueline and overlay layers are attached to each other to form a composite wood panel piece. This occurs by a lamination process as the first glueline layer melts, it not only covers and/or fills the voids in the surface of the wood composite material, and suppresses telegraphing, but it also acts as an adhesive to bond the wood composite to the second glueline layer while the resins in the second glueline layer in turn bond and adhere the overlay layer.

The components are brought into contact with each other using a typical 4'×8' hot-press and held together for a period of about 1 minute to about 5 minutes, preferably about 2 minutes to about 3 minutes to establish a good adhesive bond. The press pressure was maintained of about 50 psi to about 400 psi, preferably about 150 psi to about 250 psi, and the press temperature was held at about 100° F. to about 500° F., preferably about 200° F. to about 400° F. Typically, the first glueline melts and begins to flow at a temperature of about 175° F. to about 250° F. while the second glueline melts and begins to flow at a temperature of about 250° F. to about 350° F. Preferably, the first glueline and the second glueline are applied at concentrations of about 6 g/ft$^2$ to about 15 g/ft$^2$.

The invention will now be described in more detail with respect to the following, specific, non-limiting examples.

EXAMPLES

Several laminated wood panels were made according to the present invention. All of these examples were made starting with an Advantech OSB panel made upon a pilot-scale press available from Newman Machine Company, Greensboro, N.C., or Dieffenbacher Maschinenfabrik GmbH, Zaisenhausen, Germany.

A layered laminated wood panel was then formed in a succession of layers: a first glueline layer adhered directly to the surface of the wood panel, a second glueline layer adhered to the first glueline, and then finally a top overlay layer. The first glueline is selected from epoxy and hotmelt resins epoxy and hotmelt resins provided by Valspar Corporation; while the second glueline layer is selected from melamine and phenolic resins provided by Panolam Industries. The specific details of which glueline was used in the present examples is described in greater detail in the tables, below.

The top overlay layer was selected from one of the following: (1) a vertical grade high-pressure laminate 0.028" thick; (2) a horizontal grade high-pressure laminate 0.048" thick; or (3) a 0.020" thick 70-148 lbs basis weight phenolic-impregnated kraft paper. Again, the specific overlay layer that is used for each sample is listed in the table below. The high-pressure laminates were obtained from Panolam Industries, Morristown, Tenn. and the kraft paper was that supplied by the Dynea Corporation, Tacoma, Wash.

The epoxy/hotmelt adhesive sheets were applied to the OSB panel and the resin sheet began flowing as pressure was added at a temperature of 212° F. for about 30 seconds, thus flowing into the voids on the surface of the Advantech OSB panel covering and/or filling the voids and imperfections. Then the melamine/phenolic adhesive sheet was applied and a pressure of 200 psi and a temperature of 350° F. for about 90 seconds. After the application of the aforementioned sheets, the sheets and OSB forming together the wood panel was pressed for a total of 2 minutes at 200 psi and 350° F.

Several samples were then prepared. Samples 1-24 were prepared according to the present invention with a double glueline, while samples 25-30 were prepared according to the prior art. In samples 1-4, 9 and 10, the first glueline layer was hotmelt and the second glueline layer was phenolic; the top laminate overlay layer was selected to be either HPL or kraft paper. In samples 5-8, 11 and 12 the first glueline layer was hotmelt and the second glueline layer was melamine with the top laminate overlay layer selected to be either HPL or kraft paper. In samples 13-16, 21 and 22, the first glueline layer was epoxy and the second glueline layer was phenolic with the top laminate overlay layer selected to be either HPL or kraft paper. In samples 17-20, 23 and 24 the first glueline layer was epoxy and the second glueline layer was melamime with the top laminate overlay layer selected to be either HPL or kraft paper. In samples 25-30, only a single phenolic glueline as the resin layer was used, while the top laminate overlay layer selected to be either HPL or kraft paper.

The hotmelt and epoxy resin layers both began to flow under the temperature of 212° F., after about 30 seconds, while the phenolic and melamine resin sheets began to flow at 300° F. after about 55 seconds. The panels were pressed at 200 psi for 2 minutes. Duplicate tests were run for every different board configuration. The panels were measured for surface defects based upon their 4'×4' area or 16 sq.ft. area. The 4'×4' area was selected from the center of the 4'×8' sample taken to measure the surface defects. The results are set forth in table I, below.

TABLE 1

| Sample ID | Resin Layer 1 | Resin Layer 2 | Overlay Layer | #Surface Defects/16 ft² |
|---|---|---|---|---|
| 1 | Hotmelt | Phenolic | VG-Laminate | 3 indentations |
| 2 | Hotmelt | Phenolic | VG-Laminate | 4 telegraphing/blisters |
| 3 | Hotmelt | Phenolic | HG-Laminate | 2 telegraphing/blister |
| 4 | Hotmelt | Phenolic | HG-Laminate | 3 telegraphing spots |
| 5 | Hotmelt | Melamime | VG-Laminate | 2 telegraphing spots |
| 6 | Hotmelt | Melamime | VG-Laminate | 5 telegraphing spots |
| 7 | Hotmelt | Melamime | HG-Laminate | Perfect Board |
| 8 | Hotmelt | Melamime | HG-Laminate | 2 voids |
| 9 | Hotmelt | Phenolic | 132# Kraft Paper | 1 telegraphing spot |
| 10 | Hotmelt | Phenolic | 132# Kraft Paper | Perfect Board |
| 11 | Hotmelt | Melamime | 132# Kraft Paper | Perfect Board |
| 12 | Hotmelt | Melamime | 132# Kraft Paper | 3 Indentations/blisters |
| 13 | Epoxy | Phenolic | VG-Laminate | Blisters |
| 14 | Epoxy | Phenolic | VG-Laminate | Perfect Board |
| 15 | Epoxy | Phenolic | HG-Laminate | Perfect Board |
| 16 | Epoxy | Phenolic | HG-Laminate | Perfect Board |
| 17 | Epoxy | Melamime | VG-Laminate | 3 Indentations |
| 18 | Epoxy | Melamime | VG-Laminate | Perfect Board |
| 19 | Epoxy | Melamime | HG-Laminate | Perfect Board |
| 20 | Epoxy | Melamime | HG-Laminate | 1 telegraphing spot |
| 21 | Epoxy | Phenolic | 132# Kraft Paper | Perfect Board |
| 22 | Epoxy | Phenolic | 132# Kraft Paper | 1 blister |
| 23 | Epoxy | Melamime | 132# Kraft Paper | Perfect Board |
| 24 | Epoxy | Melamime | 132# Kraft Paper | 2 telegraphing spots |
| 25 (Prior Art) | Phenolic | None | 132# Kraft Paper | 12 voids/indentations/telegraphing |
| 26 (Prior Art) | Phenolic | None | 132# Kraft Paper | 16 voids/telegraphing/blisters |
| 27 (Prior Art) | Phenolic | None | VG-Laminate | 32 voids/indentations/Telegraphing |
| 28 (Prior Art) | Phenolic | None | VG-Laminate | 37 voids/indentations/telegraphing |
| 29 (Prior Art) | Phenolic | None | HG-Laminate | 28 voids/indentations/telegraphing |
| 30 (Prior Art) | Phenolic | None | HG-Laminate | 35 voids/indentations/telegraphing |

As can be seen in Table 1, above, the panels prepared according to the present invention performed significantly better than the prior art panels. Among panels 1-24 which were prepared according to the present invention, 10 were perfect, showing no surface defects in the top laminate overlay layer. Several other panels in this group had only between 1-3 surface defects, indicating a near perfect panel. Only two panels had more than 3 surface defects.

By contrast, among the prior art panels, there were a large number of surface defects—an average of almost 27 defects per board.

Next the bonding durability of the samples was measured, the results of the durability measurements being set forth in Table 2 The samples are cut into 2"×4" rectangles and the overlay (high-pressure laminate or kraft paper) is cut into only as far as the thickness of the overlay. The cuts are made 1" in from either length end of the sample on the one side of the overlay. The samples are then conditioned to 4 hours of boiling water and 20 hours of drying at 212° F. The samples are then tested in accordance with peeling the overlay from the center to the edge at a 90° angle while the peel is started at a corner with a flat object. Specifically, the bond durability is a measure of how well both the vertical and horizontal grade high-pressure laminates as well as kraft paper adhered to the underlying OSB substrate either using the dual glueline 2-layer resin system or just the single glueline. The standard for passing bond durability is at least an 80% wood failure durability—in the present case every durability measured exceeded 80%.

TABLE 2

Bonding Durability and Internal Bonding performance

| Sample ID | Resin Layer 1 | Resin Layer 2 | Overlay Layer | % bond | IB (PSI) |
|---|---|---|---|---|---|
| 1 | Hotmelt | Phenolic | VG-Laminate | 85 | 96.8 |
| 2 | Hotmelt | Phenolic | VG-Laminate | 95 | 87.9 |
| 3 | Hotmelt | Phenolic | HG-Laminate | 95 | 100.1 |
| 4 | Hotmelt | Phenolic | HG-Laminate | 100 | 97.4 |
| 5 | Hotmelt | Melamime | VG-Laminate | 90 | 85.6 |
| 6 | Hotmelt | Melamime | VG-Laminate | 95 | 96.0 |
| 7 | Hotmelt | Melamime | HG-Laminate | 100 | 80.7 |
| 8 | Hotmelt | Melamime | HG-Laminate | 95 | 92.1 |
| 9 | Hotmelt | Phenolic | 132# Kraft Paper | 100 | 79.4 |
| 10 | Hotmelt | Phenolic | 132# Kraft Paper | 95 | 85.9 |
| 11 | Hotmelt | Melamime | 132# Kraft Paper | 95 | 100.0 |
| 12 | Hotmelt | Melamime | 132# Kraft Paper | 90 | 81.7 |
| 13 | Epoxy | Phenolic | VG-Laminate | 100 | 65.8 |
| 14 | Epoxy | Phenolic | VG-Laminate | 100 | 117.7 |
| 15 | Epoxy | Phenolic | HG-Laminate | 95 | 127.4 |
| 16 | Epoxy | Phenolic | HG-Laminate | 100 | 109.3 |
| 17 | Epoxy | Melamime | VG-Laminate | 100 | 83.6 |
| 18 | Epoxy | Melamime | VG-Laminate | 100 | 92.6 |
| 19 | Epoxy | Melamime | HG-Laminate | 95 | 98.0 |
| 20 | Epoxy | Melamime | HG-Laminate | 100 | 102.5 |
| 21 | Epoxy | Phenolic | 132# Kraft Paper | 100 | 86.3 |
| 22 | Epoxy | Phenolic | 132# Kraft Paper | 100 | 74.8 |
| 23 | Epoxy | Melamime | 132# Kraft Paper | 95 | 94.6 |
| 24 | Epoxy | Melamime | 132# Kraft Paper | 100 | 99.8 |
| 25 (Prior Art) | Phenolic | None | 132# Kraft Paper | 100 | 103.6 |
| 26 (Prior Art) | Phenolic | None | 132# Kraft Paper | 95 | 96.8 |
| 27 (Prior Art) | Phenolic | None | VG-Laminate | 90 | 90.5 |
| 28 (Prior Art) | Phenolic | None | VG-Laminate | 100 | 124.7 |

TABLE 2-continued

Bonding Durability and Internal Bonding performance

| Sample ID | Resin Layer 1 | Resin Layer 2 | Overlay Layer | % bond | IB (PSI) |
|---|---|---|---|---|---|
| 29 (Prior Art) | Phenolic | None | HG-Laminate | 95 | 64.1 |
| 30 (Prior Art) | Phenolic | None | HG-Laminate | 100 | 74.3 |

On average the bond durability obtained was 95% wood failure. As can be seen in table 2, the panels prepared according to the present invention obtained bond durability performance of 95% wood failure, this was comparable to the performance obtained with the prior art. Thus, the present invention provides a panel with greatly reduced surface defects, and yet this greatly improved surface appearance is obtained without compromising the bond durability performance.

Next the internal bonding of the samples was measured. One problem that could potentially arise from using the present "four layer" structure of wood-composite substrate, first and second gluelines and overlay layer is that the panel structure could be less robust and have poorer internal cohesion than a panel that is constructed from a simpler construction where a single veneer layer is placed over a wood composite core. In order to determine if the panels prepared according to the present invention suffered from this drawback, the internal bonding strength was measured, using ASTM standard D1037-98. The results of the internal bonding measurements are set forth in Table 2, above.

As can be seen in Table 2, the panels prepared according to the present invention obtained average internal bond strength that was comparable and in many cases exceeded the internal bond strength measured for the simpler wood panel constructions of the prior art. Thus, the present invention provides a panel with the advantages mentioned above, without compromising the internal bonding and cohesion performance of the panel. This despite the fact that the present invention has two additional layers compared with the prior art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A wood panel comprising:
   a composite wood component having upper and lower surface layers and a core layer;
   a first glueline layer;
   a second glueline layer; and
   an overlay layer;
   wherein the first glueline layer is disposed between the composite wood component and the second glueline layer, and the second glueline layer is disposed between the first glueline layer and the overlay layer.

2. The wood panel according to claim 1, wherein the composite wood component is oriented strand board.

3. The wood panel according to claim 1, wherein the first glueline layer has a first melting temperature and the second glueline layer has a second melting temperature, the first melting temperature being lower than the second melting temperature.

4. The wood panel according to claim 1, wherein the first glueline layer is selected from the group comprising epoxy and hotmelt resins.

5. The wood panel according to claim 1, wherein the second glueline layer is selected from the group comprising melamine and phenolic resins.

6. The wood panel according to claim 1, the first glueline is applied at a concentration of about 6 g/ft$^2$ to about 15 g/ft$^2$.

7. The wood panel according to claim 1, wherein the overlay layer has a thickness of about 0.028 inches to about 1.250 inches.

8. The wood panel according to claim 1, wherein the second glueline layer is a phenolic resin, and the overlay layer is impregnated with the phenolic resin.

9. The wood panel according to claim 6, the second glueline is applied at a concentration of about 6 g/ft$^2$ to about 15 g/ft$^2$.

10. A process for preparing a wood panel comprising the steps of:
    providing a composite wood component, the wood component including an upper surface layer, the upper surface layer having an exterior face;
    providing an overlay layer, having a thickness of about 0.028 inches to about 1.250 inches;
    applying a first glueline layer to the exterior face of the upper surface layer;
    applying a second glueline layer onto the first glueline layer; and
    applying the overlay layer to the second glueline layer to form a wood panel.

11. The process according to claim 10, wherein the overlay layer is contacted to the resin applied face at a pressure of about 150 psi to about 250 psi.

12. The process according to claim 10, wherein the first glueline layer is applied at a concentration of about 6 g/ft$^2$ to about 15 g/ft$^2$; and the second glueline layer is applied at a concentration of about 6 g/ft$^2$ to about 15 g/ft$^2$.

13. The process according to claim 10, wherein contacting the overlay layer to the resin applied face occurs in a press, and the temperature of the press was about 100° F. to about 500° F.

* * * * *